United States Patent Office 3,343,337
Patented Sept. 26, 1967

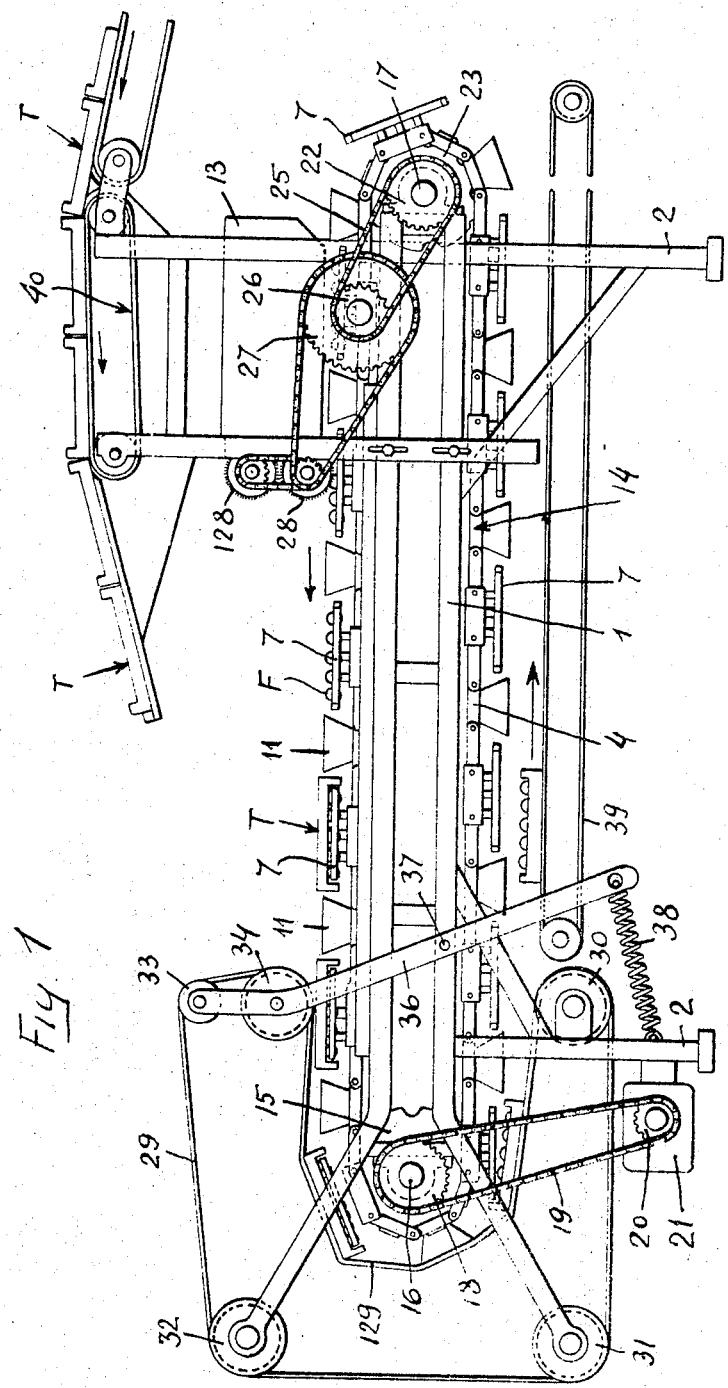

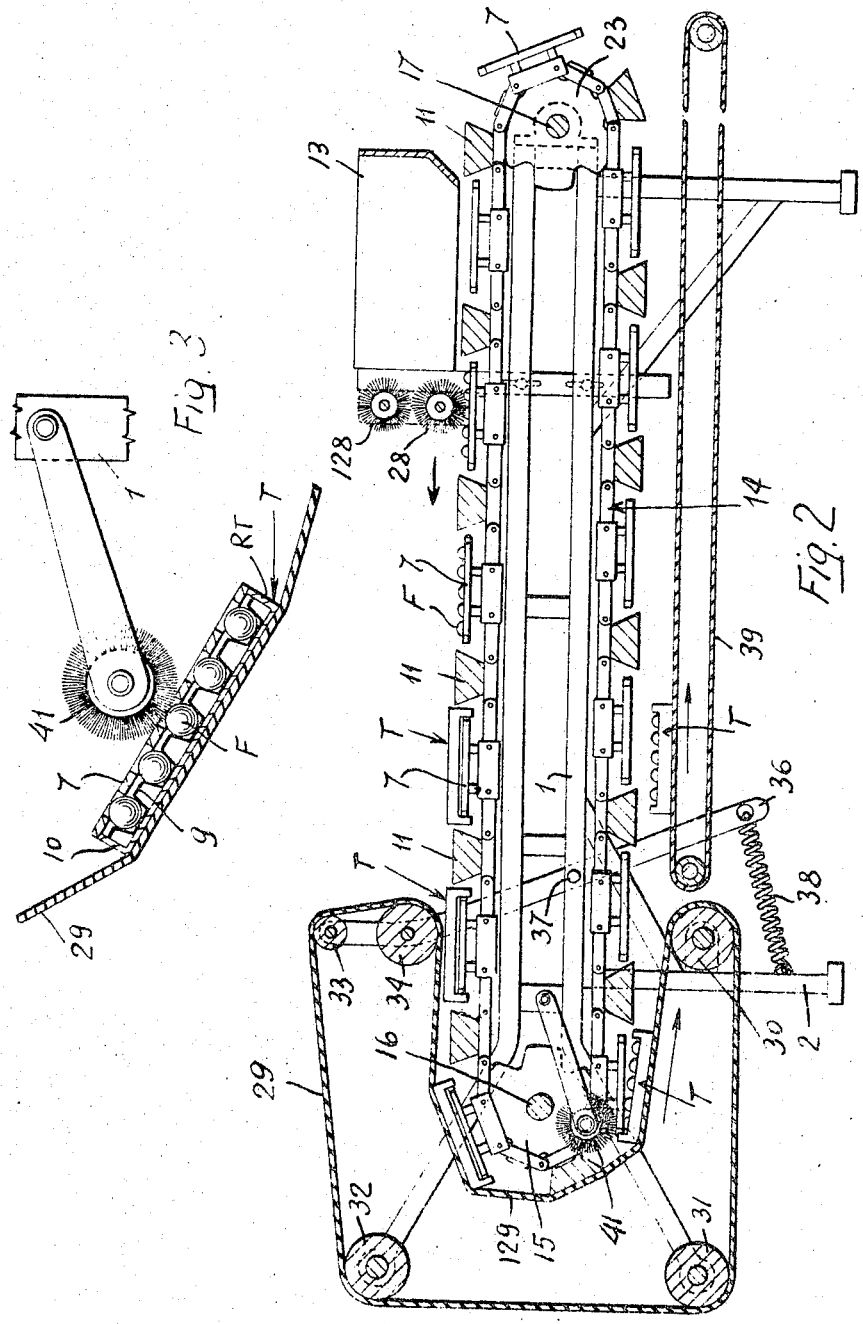

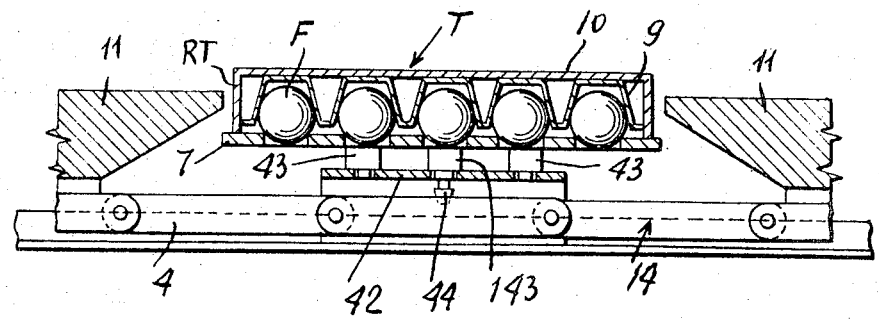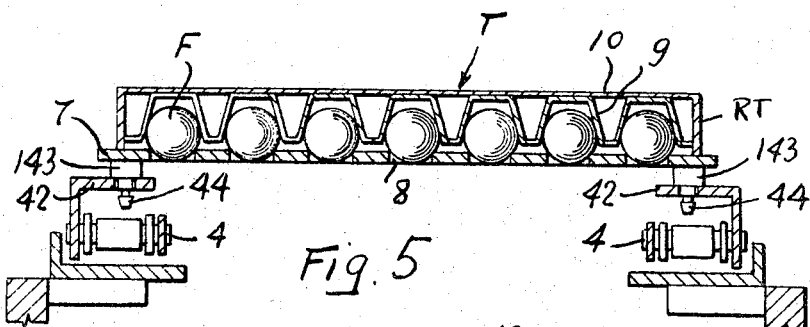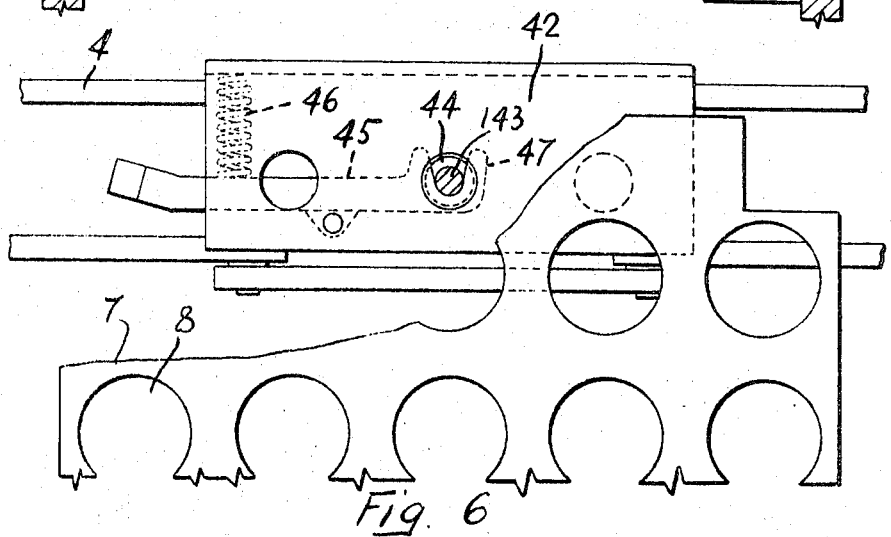

3,343,337
APPARATUS FOR PACKING FRUIT AND
LIKE ARTICLES
Ercole Dalle Vacche, Massalombarda, Italy, assignor to
Compagnia Italiana Nest-Pack, S.p.A., Bologna, Italy,
a corporation of Italy
Filed Dec. 17, 1963, Ser. No. 331,331
Claims priority, application Italy, Dec. 17, 1962,
24,993/62
5 Claims. (Cl. 53—392)

This invention relates to apparatus for automatically packing fruit or like articles having a substantially round, regular shape, such as apples, peaches, apricots and the like, in trays having fruit-holding pockets, and particularly in composite trays comprising an outer pocketless walled tray, made of rigid material such as wood, and an inner tray made preferably of a thin film of synthetic resin and provided with fruit-holding pockets, for example of the kind as disclosed in the U.S. Patent No. 3,074,582.

Apparatus for packing substantially round fruits or the like (the term fruit being generally used for indicating one of the many substantially round articles which may be packed like fruits) are designed for employing trays having pockets for receiving the fruit in a predetermined pattern such as the known semi-rigid shallow papier-maché trays which, after their pockets are filled with fruit, are subsequently stacked in cases or boxes. Such apparatus, for example as disclosed in U.S. Patent 2,763,110, usually include conveyor belts provided with series of apertures each of which is large enough to provide a pocket for receiving a piece of fruit, but small enough to prevent the fruit from falling through. Such apparatus however, besides requiring the use of shallow semi-rigid trays, which must be such as to bend in correspondence of the ends of the run of a conveyor belt, present a number of drawbacks, among which there may be mentioned the fact that the fruit inserted between the openings in the belt and the overlying tray is somewhat compressed and squeezed between these parts and may become bruised or otherwise damaged. Furthermore, if the machine should be employed for packing different-sized fruits, the whole belt provided with apertures must be changed and substituted with another belt having different-sized apertures disposed in a different pattern, to suit the pattern of the pockets of the tray adapted for holding said fruit. This entails the necessity of having a series of belts provided with differently sized apertures arranged on different pattern and the necessity of changing said belts each time the size or quality of the fruit to be packed is changed, the substitution of the belts being by no means easy, while the necessity of having a stock of belts provided with differently sized and pattern apertures increases the machine cost.

Furthermore, the known machines are not adapted to pack the fruit in very light trays made of films of synthetic resin and provided with yielding pockets (such as those disclosed in said U.S. Patent 3,074,582) in which the fruit is firmly but very softly held in place. These light synthetic resin trays are usually inserted in rigid trays, generally made of wood and provided with peripheral walls, said rigid trays being usually made so as to permit their stacking, even without the use of other boxes or cases.

Another inconvenience of the known machines resides in the fact that, when the fruit pieces are fed from a hopper upon the belt, so as to fill the aperture therein, a part of the fruit pieces is entrapped in the belt section between two adjacent series of apertures and when the belt section comes out from beneath the feed hopper or the like, a quite larger number of fruit pieces, which lie outside the aperture in the belt, roll down and must be taken and loaded again into the hopper, or even discarded, when they come to be bruised or otherwise damaged.

The apparatus according to the invention eliminates the inconveniences of the known apparatus, and permits the use of composite trays comprising a conventional rigid tray provided with shallow upstanding walls, but without pockets, adapted to be directly stacked even without the use of outer containers, and in which fruit-holding trays provided with pockets are inserted, said fruit-holding trays being preferably very light and flexible and made preferably of a film of synthetic resins.

In order to permit the use of said rigid trays without pockets, in which light trays provided with pockets are inserted, according to the invention, the apparatus is provided with a pair of conveyor chains between which there are mounted, conveniently spaced, and projecting above the upper run and/or below the lower chain run fruit-supporting and holding plates provided with apertures of convenient size arranged in a predetermined pattern, which corresponds to the pattern of the pockets of said flexible light trays, inserted in rigid trays. These conveyor chains carry also, between each pair of apertured plates, a fruit-retaining block, having preferably an inverted trapezoidal shape with the larger base projecting beyond the plane of the adjoining apertured plates, and which form retaining walls for the transversal ends of the adjoining apertured plates and at the same time prevent the fruit pieces from falling in the space between each pair of adjoining plates during the running of the chains. Said blocks, according to the invention, serve also as spacing blocks for a tray-retaining belt arranged in correspondence of one of the conveyor chain-driving pair of sprocket wheels mounted at the end of the conveyor chain and over which the upper conveyor run is trained to become the lower conveyor run.

According to the invention, the said apertured plates may be easily dismanteled and substituted with other plates having different sized and patterned apertures to suit the size of different fruit to be packed.

Other improvements and advantages of the fruit-packing apparatus according to the invention will be apparent from the following specification made with reference to the accompanying drawings, in which:

FIGURE 1 is a side elevation of a fruit-packing apparatus according to the invention;

FIGURE 2 is a longitudinal vertical section through the same apparatus;

FIGURE 3 is an enlarged vertical section through one of the fruit-holding plates provided with apertures filled with fruit and upon which a composite tray has been fitted, said tray being in tray-detaching position in correspondence of the beginning of the lower chain run and of the tray-retaining belt;

FIGURES 4 and 5 are an enlarged vertical longitudinal section and a cross section respectively through one of the fruit-holding plates filled with fruit and with super-posed composite tray; and FIGURE 6 is a top plan view with parts broken away, of the fruit holding plate and shows the means for mounting the plate onto the conveyor chain.

With reference to the drawing, the apparatus forming the object of the invention comprises a frame 1, made of profiled metallic members bearing upon legs 2 and provided with guide members (FIGURES 1 and 2) upon which a chain conveyor 14, formed by two chains 4, may run. To the links of said chains there are fastened plates 7 projecting above the plane of the upper run and beneath the lower run of said conveyor chains and provided with a plurality of fruit holding apertures 8 adapted to receive and hold the fruit F to be packed, while preventing said fruit from falling through and also adapted to support the inverted trays T, composed of an outer rigid tray 10 having shallow peripheral enclosure walls and an inner light and flexible tray 9 having a number of receiving seats or pockets corresponding to the number of the apertures 8 of plates 7 and arranged in a like pattern. Said light flexible trays 9 are made of a thin film of synthetic resin and have yielding pockets.

Between said apertured plates 7, substantially inverted trapezoidal blocks 11 are fastened, the sides 12 of which as well as the top bases, project beyond the top of plates 7 and prevent fruit from falling from the feed hopper 13 or from the edges of plates 7 in the space between adjoining plates 7.

The chain conveyor 14 is supported by two pairs of sprocket wheels 15–23 meshing with the chain links.

Said sprockets wheels 15–23 are mounted on shafts 16 and 17, respectively. Upon shaft 16 a sprocket wheel 18 is also fastened which is connected by chain 19 and sprocket pinion 20 to a reduction gear 21 which constitutes the source of rotary movement for the several revolving parts of the whole machine.

At the opposite end, a second sprocket wheel 22 is mounted upon shaft 17. Sprocket wheel 22 drives through chain 25 and pinion 26 a like sprocket wheel 27 which, in its turn, drives a revolving brush 28 the lower part of which revolves slightly above the fruit-holding plates 7 carried therebeneath by the chain conveyor 14, and serves for brushing off any fruit which is not firmly held in the plate openings 8. A second brush 128, arranged above said brush 28 and in parallel contact therewith is driven by means of a chain-and-sprocket drive from the shaft of brush 28 and serves to remove foreign material from said brush 28.

The apparatus also includes a tray-feed device 40, FIGURE 1, and a belt 29, FIGURES 1 and 2, which is mounted upon three fixed rollers 30, 31, 32 and a pair of rollers 33, 34, mounted at one end of a double-armed lever 36, fulcrumed on the machine frame as at 37 and acting as tensioning rollers by being urged in belt-tensioning direction by a spring 38 anchored between the opposite lever end and a fixed part of the apparatus. This belt is tensioned substantially at the four corners of a quadrilateral, one side of which is arranged to face one end of the chain conveyor 14 where it is bent by said conveyor and attached parts (see left-hand side of FIGURES 1 and 2) so as to form a loop 129 which encircles said conveyor end and the parts carried thereby. A second belt conveyor 39 is arranged parallel to the lower run of the chain conveyor 14, with its inlet end adjoining the outlet or lower end of the just-described belt 29.

At the lower end of the part of the chain conveyor 14 which is encircled by said belt loop 129, another cylindrical fruit-ejecting brush 41 is mounted upon a swinging arm so as to bear upon the reverse side of the plates 7 passing therebeneath and serves for ejecting from the openings 8 of plate 7 any fruit which tends to remain clamped in its seat opening.

The operation of the apparatus is as follows:

When the conveyor chain 4 is driven (anticlockwise direction in the drawing), the plates 7 pass under the hopper 13 filled with fruit and the fruit pieces in correspondence of the plate openings 8 fall in said openings, while those which come to be in correspondence with the unperforated parts of plates 7 or of the top of the blocks 11 are not carried outside said hopper 13. As soon as plates 7 whose openings 8 are filled with fruit F come out of the hopper, an operator takes a composite tray from the feed device 40 and fits same in inverted position upon said plates 7, so that the fruit pieces F nest themselves in the pockets of the flexible tray inserts 9. By further running, the plates 7 capped with trays T and with the fruit pieces trapped therebetween pass under the loop 129 of belt 29 and by rolling about wheel 15 are capsized so that the trays T are righted i.e. with their bottom down, while the plates 7 are in inverted position. In this position, they are brushed from the reverse side by fruit-ejecting brush 41, so that all the fruits are ejected from the plate openings and inserted into the pockets of the flexible tray inserts 9. The trays T filled with fruit pieces F are then carried away by the lower conveyor belt 39.

As said in the preamble, the described arrangement permits the plates 7 to be easily dismountable from the conveyor chains, to be replaced with plates having differently sized and patterned openings 8. An embodiment of easily dismountable plates 7 is shown in FIGURES 4, 5 and 6 of the drawing, in which the plates 7 are provided with depending posts 43–143–43 which bear upon the horizontal wing of an angle plate 42 mounted upon the pivot pins of the conveyor chain 14. The post 143 has a depending stem ending with a preferably conical head 44, while the horizontal wing of said angle plate 42 is provided with a double-armed lever provided at the end with a forked head 47 which is urged against the stem of post 143 under the conical head 44 by a spring 46. When the forked head 47 is hooked under head 44, the corresponding plate is held firmly in position. When however the lever 45 is swung so that the forked head 47 comes away from head 44, the plate 7 may be easily dismounted.

Of course, the apparatus according to the invention may undergo numerous changes, though remaining within the scope of the appended claims. Thus instead of the trapezoidal blocks 11, other plates may be employed, which overlie in part with their edges the edges of plates 7.

I claim:

1. Apparatus for packing fruits and the like in a composite tray, said apparatus comprising, in combination,
    a frame,
    endless conveyor means supported by said frame and presenting upper and lower flights,
    means for driving said endless conveyor means,
    a plurality of plates, each having an array of apertures therein,
    means for detachably connecting said plates to said endless conveyor means in longitudinally spaced relation thereon,
    feed means disposed above said upper flight for discharging articles onto said plates as they pass therebeneath,
    bridge members carried by said endless conveyor means bridging between the adjacent edges of the spaced plates, and
    a fruit-ejecting brush fitted at the outlet end of said conveyor means in such a position as to act on the reverse of said plates to eject fruit which may be clamped in the plate openings.

2. Apparatus for packing fruits and the like in a composite tray, said apparatus comprising, in combination,
    a frame,
    endless conveyor means supported by said frame and presenting upper and lower flights,
    means for driving said endless conveyor means,
    a plurality of plates, each having an array of apertures therein,
    means for detachably connecting said plates to said endless conveyor means in longitudinally spaced relation thereon,
    feed means disposed above said upper flight for discharging articles onto said plates as they pass therebeneath,
    and bridge members carried by said endless conveyor means bridging between the adjacent edges of the spaced plates, said bridge members being in the form of trapezoidal blocks.

3. Apparatus for packing fruits and the like in a composite tray, said apparatus comprising, in combination,
    a frame,
    endless conveyor means supported by said frame and presenting upper and lower flights,
    means for driving said endless conveyor means, a plurality of plates, each having an array of apertures therein, means for detachably connecting said plates to said endless conveyor means in longitudinally spaced relation thereon, feed means disposed above said upper flight for discharging articles onto said plates as they pass therebeneath, and bridge members carried by said endless conveyor means bridging between the adjacent edges of the spaced plates, said feed means being in the form of a hopper having a discharge mouth immediately above the level of the upper flight and open at that side thereof in the direction of conveyor means movement, and brush means within said open side of the hopper for sweeping excess articles from a filled plate back over the corresponding bridge member to the region of said discharge mouth of the hopper.

4. Apparatus for packing fruits and the like in a composite tray, said apparatus comprising, in combination, a frame, endless conveyor means supported by said frame and presenting upper and lower flights, means for driving said endless conveyor means, a plurality of plates, each having an array of apertures therein, means for detachably connecting said plates to said endless conveyor means in longitudinally spaced relation thereon, feed means disposed above said upper flight for discharging articles onto said plates as they pass therebeneath, and bridge members carried by said endless conveyor means bridging between the adjacent edges of the spaced plates, said endless conveyor means being in the form of a pair of parallel chains, said means for detachably connecting said plates to the conveyor means comprising pedestals attached to said chains for positioning the plates above the level of the upper flight of the conveyor means, said bridge members being of a length to overlap and overlie the adjacent edges of the plates.

5. Apparatus for packing fruits and the like in a composite tray, said apparatus comprising, in combination, a frame, endless conveyor means supported by said frame and presenting upper and lower flights, means for driving said endless conveyor means, a plurality of plates, each having an array of apertures therein, means for detachably connecting said plates to said endless conveyor means in longitudinally spaced relation thereon, feed means disposed above said upper flight for discharging articles onto said plates as they pass therebeneath, bridge members carried by said endless conveyor means bridging between the adjacent edges of the spaced plates, and an endless belt having a portion contoured to pass in spaced relation to the endless conveyor means between the upper and lower flights thereof at the discharge end of the conveyor means, said bridge members engaging said endless belt portion to maintain such spacing.

References Cited

UNITED STATES PATENTS

| | | | |
|---|---|---|---|
| 2,079,778 | 5/1937 | Thom | 53—250 |
| 2,763,110 | 8/1956 | Stuart | 53—392 X |
| 3,021,655 | 2/1962 | Chadima et al. | 53—246 X |

ROBERT C. RIORDON, *Primary Examiner.*

FRANK E. BAILEY, *Examiner.*

R. J. ALVEY, P. H. POHL, *Assistant Examiners.*